United States Patent
Szalai et al.

(10) Patent No.: US 10,370,585 B2
(45) Date of Patent: Aug. 6, 2019

(54) WEAK GEL SYSTEM FOR CHEMICAL ENHANCED OIL RECOVERY

(71) Applicant: Ecolab USA Inc., St. Paul, MN (US)

(72) Inventors: Michael L. Szalai, Denver, CO (US); Mei Liu, Plainfield, IL (US); Kin-Tai Chang, Sugar Land, TX (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 15/360,148

(22) Filed: Nov. 23, 2016

(65) Prior Publication Data

US 2017/0145292 A1    May 25, 2017
US 2017/0362494 A9    Dec. 21, 2017

Related U.S. Application Data

(60) Provisional application No. 62/258,808, filed on Nov. 23, 2015.

(51) Int. Cl.
| | |
|---|---|
| *E21B 43/20* | (2006.01) |
| *C09K 8/588* | (2006.01) |
| *C09K 8/508* | (2006.01) |
| *C09K 8/512* | (2006.01) |

(52) U.S. Cl.
CPC ............ *C09K 8/588* (2013.01); *C09K 8/5083* (2013.01); *C09K 8/512* (2013.01); *E21B 43/20* (2013.01)

(58) Field of Classification Search
CPC ................................ C09K 8/588; E21B 43/20
USPC ........................................................ 166/305.1
See application file for complete search history.

(56) References Cited

U.S. PATENT DOCUMENTS

| | | | |
|---|---|---|---|
| 3,316,181 A | 4/1967 | Sackis | |
| 3,585,148 A | 6/1971 | Sackis | |
| 4,120,815 A | 10/1978 | Raman | |
| 6,569,983 B1* | 5/2003 | Treybig | ........... C08G 59/50 166/270 |
| 6,984,705 B2 | 1/2006 | Chang et al. | |
| 2003/0191030 A1* | 10/2003 | Blair | ............ C09K 8/68 507/225 |
| 2005/0230113 A1 | 10/2005 | Eoff et al. | |
| 2006/0260812 A1 | 11/2006 | Eoff et al. | |

(Continued)

FOREIGN PATENT DOCUMENTS

| | | |
|---|---|---|
| WO | 2010/147901 A1 | 12/2010 |
| WO | 2013/108174 A1 | 7/2013 |
| WO | 2014/082001 A1 | 5/2014 |

OTHER PUBLICATIONS

Han, M., et al., "State-of-the-Art of In-Depth Fluid Diversion Technology: Enhancing Reservoir Oil Recovery by Gel Treatments," SPE-172186-SPE, Society of Petroleum Engineers Saudi Arabia Section Technical Symposium and Exhibition, Apr. 21-24, 2014, pp. 1-10.

(Continued)

*Primary Examiner* — Silvana C Runyan
(74) *Attorney, Agent, or Firm* — Stinson LLP (57) ABSTRACT

Method are provided for treating a wellbore or subterranean hydrocarbon-bearing formation to increase hydrocarbon recovery from the formation by in-depth mobility control and/or fluid diversion conformance by introducing a water soluble acrylamide polymer and a non-metallic organic crosslinking agent, or a crosslinkable acrylamide polymer, into an injection fluid entering the wellbore or the formation.

18 Claims, 2 Drawing Sheets

(56) References Cited

U.S. PATENT DOCUMENTS

| | | | |
|---|---|---|---|
| 2012/0004148 A1* | 1/2012 | Ogle | C09K 8/12 |
| | | | 507/213 |
| 2012/0132422 A1 | 5/2012 | Mirakyan et al. | |
| 2012/0279727 A1 | 11/2012 | Kakadjian et al. | |
| 2013/0000905 A1* | 1/2013 | Reddy | C09K 8/035 |
| | | | 166/295 |
| 2014/0076562 A1* | 3/2014 | Bhaduri | C09K 8/5083 |
| | | | 166/295 |
| 2014/0209305 A1 | 7/2014 | Lin et al. | |
| 2016/0200963 A1 | 7/2016 | Reed et al. | |

OTHER PUBLICATIONS

Abhijit, S., et al., "Mobility Control and Enhanced Oil Recovery Using Partially Hydrolysed Polyacrylamide (PHPA)," International Journal of Oil, Gas and Coal Technology, Jun. 2013, pp. 245-258, vol. 6, No. 3.

Gaillard, N., et al., "Improved Oil Recovery Using Thermally and Chemically Protected Compositions Based on Co- and Ter-Polymers Containing Acrylamide," SPE Improved Oil Recovery Symposium, Tulsa, Oklahoma, Document SPE 129756, Apr. 24-28, 2010, pp. 1-11, Society of Petroleum Engineers.

International Search Report and Written Opinion issued for PCT/US2016/063469, dated Feb. 26, 2017, 19 pages.

Extended European Search Report and Written Opinion issued for EP16869214.3 dated May 24, 2019, 9 pages.

\* cited by examiner

WEAK GEL SYSTEM FOR CHEMICAL ENHANCED OIL RECOVERY

CROSS-REFERENCE TO RELATED APPLICATION

This application claims priority to U.S. Provisional Patent Application Ser. No. 62/258,808 filed on Nov. 23, 2015, the disclosure of which is incorporated herein by reference in its entirety.

FIELD OF THE INVENTION

The present invention generally relates to methods of treating a wellbore or subterranean hydrocarbon-bearing formation to increase hydrocarbon recovery from the formation by in-depth mobility control and/or fluid diversion conformance, and particularly in oil reservoirs having a high temperature, or including high salinity brines or high hardness brines.

BACKGROUND OF THE INVENTION

In the production of oil from subterranean formations, it is usually possible to recover only a small fraction of the total oil present in the formation by so-called primary recovery methods which utilize only the natural forces present in the reservoir. To recover oil beyond that which is produced by primary methods, a variety of supplemental production techniques have been employed. Secondary recovery methods rely on the supply of external energy in the form of injecting fluids to increase reservoir pressure, hence replacing or increasing the natural reservoir drive with an artificial drive. Waterflooding, via the injection of water or brine into the reservoir, is another common oil recovery method.

In the use of flooding techniques, various polymeric thickening agents have been added to the drive fluid to increase its viscosity to a point where it approaches that of the oil which is to be displaced, thus improving displacement of oil from the formation. Conventional polymer waterflooding typically utilizes a synthetic polymer, such as partially hydrolyzed polyacrylamide ("PHPA"), or a biopolymer, such as xanthan gum. However, significant viscosity loss due to shear damage and chemical degradation can affect the oil displacement efficiency in such polymer flooding operations.

The third phase of oil extraction during the lifetime of a reservoir is called tertiary recovery, or Enhanced Oil Recovery ("EOR"). Commonly, this involves injection of chemicals into the reservoir to liberate oil from rock (i.e., microscopic displacement efficiency) or polymers to improve the efficiency at which oil is pushed through the formation (i.e., macroscopic sweep efficiency). One common EOR technology is the injection of polymer to mitigate the problem of excess water production. In a process called profile modification or permeability modification, polymer gels are injected near wellbore or in-depth to preferentially seal fractures or high permeability zones, commonly called thief zones. Permeability reduction or pore blocking results from polymer adsorption in such high permeability zones. As a result of this process, subsequently injected fluids are redirected to lower permeability, unswept oil-rich zones, leading to additional oil production and reduced water-cut.

Most crosslinked polymer gel water shut-off treatments practiced today use ready-made polymers that become crosslinked and gel in the formation. One common gel system that has been extensively investigated uses PHPA or acrylamide/acrylate copolymers as the polymer component. M. Kelland, CHEMICALS FOR THE OIL & GAS INDUSTRY, Chapter 2 (2nd ed., 2014). The crosslinking agent can be an inorganic compound, typically containing chromium, aluminum, titanium, or zirconium ions. However, metallic crosslinking of carboxylate polymers such as PHPA is generally not suitable for high temperature applications. In high temperature reservoirs, excessive polymer hydrolysis can occur, resulting in syneresis via additional unwanted crosslinking between the polymer and excess crosslinker and divalent cations such as magnesium and calcium.

Delayed gel systems based on organic crosslinking of acrylamide, acrylic esters, and co-polymers thereof, have also been developed. These typically utilize dialdehydes, polyethyleneimine, or mixtures of phenolic compounds and an aldehyde as the crosslinking agent. Overall, in situ preparation of such crosslinked polymer gels have been disadvantaged by a number of factors, including high viscosity of the bulk chemical solution, uncontrolled gelation times and variations in gelation due to shear degradation, thermal instability of the gel, and sensitivity to reservoir minerals and formation water salinity. Thus, polymer gels widely used for near wellbore conformance control applications may not be effective for in-depth fluid diversion.

As an alternative to in-situ gelation treatments for in-depth fluid diversion, a newer trend is the use of preformed gels. Bai, B., "*Preformed Particle Gel for Conformance Control*," Paper presented at 6th International Conference on Production Optimization-Reservoir Conformance-Profile Control-Water/Gas Shut-Off-Houston, Tex., Nov. 6-7, 2007. In preformed gel systems, the gel is formed in surface facilities and then gel is injected into the reservoir. Preformed gel systems include preformed bulk gels, partially preformed gels, preformed particle gels, microgels (U.S. Pat. No. 6,579,909), pH sensitive crosslinked polymer, millimeter-sized swelling polymer grains, and Brightwater® microparticles (U.S. Pat. No. 6,984,705).

Weak gel technologies address the practical limitations associated with conventional polymer flooding operations and conformance control operations. Weak gels are crosslinked polymers formed in situ that have higher viscosity than conventional uncrosslinked polymer floods, enabling them to act as mobility control agents. In addition, weak gels can be used to address the problem of fluid channeling by "plugging" high permeability or thief zones, and diverting trailing fluid flow to adjacent poorly swept areas of the reservoir. Thus, weak gels can be used as conformance control agents. However, unlike traditional conformance control agents prepared as in situ gels, weak gels can more effectively be used to achieve in-depth fluid profile control. When the gelant is injected into a reservoir, a crosslinking reaction occurs in situ near the wellbore region but continue to propagate into the reservoir, preferentially penetrating more into high permeability zones than into low permeability zones. In the subsequent waterflood or chemical flood, the weak gel system may be gradually pushed deeper into the formation. In this process, the weak gel is pushed or squeezed into fine particles through the porous formations. When these particles migrate into pore throats, some of them squeeze, deform and pass through the throats propagating forward, while others are trapped at the pore throats effectively blocking high permeability zones. Thus, successful weak gel system applications improve the injection profile and balance the fluid distribution to enhance reservoir recovery, including both the areal sweep efficiency and vertical sweep efficiency. Furthermore, as the weak gel migrates slowly through the high permeability zones, it pushes forward banking oil droplets at the displacing front so that the residual oil in the high permeability zones is mobilized and recovered. Han et al., *State-of-the-Art of In-Depth Fluid Diversion Technology: Enhancing Reservoir Oil Recovery by Gel Treatments*, Paper presented at Society of Petroleum Engineers Saudi Arabia Section Technical Symposium and Exhibition, Al-Khobar, Saudi Arabia, SPE-172186-MS (Apr. 21-24, 2014).

Despite the knowledge of weak gels having utility in oilfield applications, a need remains for in-situ weak gels having satisfactory performance properties under a broad range of subterranean conditions.

SUMMARY OF THE INVENTION

A method is provided for treating a wellbore or subterranean hydrocarbon-bearing formation to increase hydrocarbon recovery from the formation (e.g., by in-depth mobility control and/or fluid diversion conformance). The method comprises introducing either a water soluble acrylamide ("AcAm") polymer and a non-metallic organic crosslinking agent, or a crosslinkable acrylamide polymer, into an injection fluid entering the wellbore or the formation. The acrylamide polymer and the crosslinking agent or the crosslinkable acrylamide polymer can form a flowable crosslinked polymer in the presence of the injection fluid flowing within the formation, and the flowable crosslinked polymer pushes the hydrocarbon out of the formation while the flowable crosslinked polymer continues to flow through the formation. The crosslinking agent comprises a polymeric polyamine which is either (i) a reaction product of a polymerization mixture comprised of at least one monomer of Formulae I, II, or III, or a salt thereof; or (ii) comprised of at least one structural unit of Formulae IA, IIA, IIIA, IIIB or IVA. Formulae I, II, III, IA, IIA, IIIA, IIIB and IVA have the following structures:

wherein $R_1$ is each independently hydrogen, a protecting group, or alkyl; and $R_2$, $R_3$, $R_4$, $R_5$, $R_6$ and $R_7$ are each independently hydrogen, alkyl, or alkoxylalkyl. The crosslinkable acrylamide polymer comprises a reaction product of a polymerization mixture comprised of at least one acrylamide monomer and at least one monomer of the Formula I, II, or III or a salt thereof.

A method is also provided for increasing the sweep efficiency of a fluid flood of a subterranean formation to enhance hydrocarbon recovery from the formation. The method comprises: introducing either a water soluble acrylamide polymer and a non-metallic organic crosslinking agent, or a crosslinkable acrylamide polymer, into an injection fluid entering a wellbore or the formation to form a crosslinked polymer in a high permeability zone existing within the formation; discontinuing hydrocarbon production from the formation being treated for a time period sufficient to allow the viscosity of the crosslinked polymer within the high permeability zone to increase so that the crosslinked polymer remains fixed within the high permeability zone to divert fluid flow into unswept zones of the formation; after the discontinuation step, introducing injection fluid into the formation being treated to flood the formation, mobilize the hydrocarbon and form a flood fluid; and removing the flood fluid containing the mobilized hydrocarbon from the well as a produced fluid, wherein the crosslinking agent comprises a polymeric polyamine which is either (i) a reaction product of a polymerization mixture comprised of at least one monomer of Formulae I, II, or III, or a salt thereof; or (ii) comprised of at least one structural unit of Formulae IA, IIA, IIIA, IIIB or IVA. Formulae I, II, III, IA, IIA, IIIA, IIIB and IVA have the structures described herein.

Other objects and features will be in part apparent and in part pointed out hereinafter.

BRIEF DESCRIPTION OF THE DRAWINGS

Corresponding reference characters indicate corresponding parts throughout the drawings.

DESCRIPTION

It has been discovered that use of certain organic crosslinking agents in combination with water soluble acrylamide based polymers, or certain crosslinkable acrylamide polymers, provides for in situ formation of a flowable crosslinked polymer in a subterranean hydrocarbon-bearing formation (such as an oil-bearing sandstone or carbonate reservoir) under a broad range of conditions. The delayed crosslinking reaction at elevated reservoir temperatures in combination with low polymer concentration and weak gel strength allows for improved injectivity and longer-term mobility in the reservoir. The use of the flowable crosslinked polymer provides an economical alternative to large scale polymer flooding for oil recovery operations.

Crosslinking of the flowable crosslinked polymer can be delayed for deep reservoir penetration to provide permeability control. A flowable pre-gel solution will exist initially but over time at reservoir temperature the polymer will continue to crosslink and gradually lose mobility as crosslinking increases. The crosslinked polymer will then act to divert fluid flow to previously unswept areas of the reservoir, thus increasing oil production.

The flowable crosslinked polymer can function as an in-depth profile modification agent and/or as an oil displacement agent. Thus, injection of the flowable crosslinked polymer can combine the advantages of both a conformance control operation and a mobility control operation. It can substantially extend the effective radius of conformance control in comparison with a conventional strong gel. The flowable crosslinked polymer effectively controls the mobility of a drive fluid during a hydrocarbon recovery operation, effectively reduces the permeability of a desired treatment region such as a high permeability zone under a broad range of subterranean conditions, provides mobility control or permeability control that is stable under harsh formation conditions including the presence of high temperatures, crude oil, high salinity brines, or high hardness brines, and is non-toxic and cost effective.

The crosslinking reaction can take place between an acrylamide polymer and a polyamine crosslinker. Alternatively, a crosslinkable acrylamide polymer can be introduced into the injection fluid entering the wellbore or formation. Without being bound by any particular theory, it is believed that at the elevated temperatures found within the subterranean formation, a transamidation reaction takes place between the amido groups of the acrylamide polymer and two or more amino groups of the polyamine crosslinker. Although it is believed that the formation of covalent bonds is the dominant mechanism of gel formation and plays a key role in the thermal stability of the produced flowable polymer, hydrogen bonds will form and ionic bonds may also be formed between negatively charged carboxylate groups in the polymer (e.g., with PHPA) and positively charged amine groups in the crosslinking agent.

The crosslinkable acrylamide polymer comprises a reaction product of a polymerization mixture comprised of at least one acrylamide monomer and at least one monomer of the Formula I, II, or III or a salt thereof. The crosslinkable acrylamide polymer contains functionalities that enable the polymer to act as a crosslinking agent. Such polymer can react with each other and form gels in aqueous media.

A method is provided for treating a wellbore or subterranean hydrocarbon-bearing formation to increase hydrocarbon recovery from the formation, such as by in-depth mobility control and/or fluid diversion conformance. The method comprises introducing either a water soluble acrylamide polymer and a non-metallic organic crosslinking agent, or a crosslinkable acrylamide polymer, into an injection fluid entering the wellbore or the formation. The acrylamide polymer and the crosslinking agent or the crosslinkable acrylamide polymer form a flowable crosslinked polymer in the presence of the injection fluid flowing within the formation and the flowable crosslinked polymer pushes the hydrocarbon out of the formation while the flowable crosslinked polymer continues to flow through the formation.

Another method is provided for increasing the sweep efficiency of a fluid flood of a subterranean hydrocarbon-bearing formation to enhance hydrocarbon recovery from the formation. The method comprises introducing either a water soluble acrylamide polymer and a non-metallic organic crosslinking agent, or a crosslinkable acrylamide polymer, into an injection fluid entering a wellbore or the formation to form a crosslinked polymer in a high permeability zone existing within the formation; and discontinuing hydrocarbon production from the formation being treated for a time period sufficient to allow the viscosity of the crosslinked polymer within the high permeability zone to increase so that the crosslinked polymer remains fixed within the high permeability zone to divert fluid flow into unswept zones of the formation. After the discontinuation step, injection fluid is introduced into the formation being treated to flood the formation, mobilize the hydrocarbon and form a flood fluid. The flood fluid containing the mobilized hydrocarbon is removed from the well as a produced fluid.

When a water soluble acrylamide polymer and a non-metallic organic crosslinking agent are introduced into the injection fluid, the water soluble acrylamide polymer used in the methods described herein can be crosslinkable polymers including at least one structural unit of formula (V):

wherein $R_1$ and $R_2$ are independently selected from a hydrogen atom and an optionally substituted alkyl group. The optionally substituted alkyl group can include 1 to 20 carbon atoms, preferably 1 to 10 carbon atoms. The optionally substituted alkyl group may incorporate an —$SO_3R^3$ moiety, wherein $R^3$ is a hydrogen atom or a cationic moiety (e.g., an alkali metal cation especially $Na^+$). A preferred polymer having a structural unit of formula (V) is the nonionic polymer known as polyacrylamide ("PAM") wherein $R_1$ and $R_2$ are hydrogen, or partially hydrolyzed polyacrylamide containing up to about 40 mole percent degree of hydrolysis. A preferred polymer having two repeat units of formula (V) is an acrylamide/2-acrylamido-2-methylpropanesulfonic acid copolymer or the sodium or ammonium salt thereof, such as an anionic copolymer of acrylamide and up to about 30 mole % of 2-acrylamido-2-methylpropane sulfonic acid.

Other acrylamide polymers including at least one structural unit of formula (V) include, but are not limited to, polymers derived from monomers of acrylamide, methacrylamide, N,N-dimethylacrylamide, N,N-diethylacrylamide, N-t-butylacrylamide, N-methylolacrylamide, or combinations thereof.

The acrylamide polymer can include at least one structural unit of formula (V) in combination with at least one structural unit of formula (VI):

wherein the O* moiety is O⁻ or is covalently bonded to another atom to form acrylic acid, a salt of an acrylic acid, or an acrylic acid ester. A preferred polymer having structural units of formula (V) and (VI) is an acrylamide/acrylic acid copolymer or a salt thereof, such as the sodium or ammonium salt thereof. A preferred polymer is an anionic copolymer of acrylamide and up to about 40 mole % of an acrylic acid ("AA") or a salt thereof, such as a partially hydrolyzed acrylamide wherein the structural unit of formula VI is a sodium salt. The partially hydrolyzed acrylamide can have a degree of hydrolysis from 0 to 40 mole percent, preferably from 0 to 30 mole percent, and more preferably from 0 to 20 mole percent.

A preferred acrylamide polymer including two structural units of formula (V) in combination with at least one structural unit of formula (VI) is an acrylamide/acrylic acid/2-acrylamido-2-methylpropanesulfonic acid terpolymer or a salt such as the sodium or ammonium salt thereof. The polymer can be an anionic terpolymer of acrylamide and up to about 40 mole percent of a combination of acrylic acid and AMPS®.

The acrylamide polymer can comprise other structural units. For example, the acrylamide polymer can comprise a terpolymer of acrylamide and up to about 40 mole % of a combination of t-butyl acrylate and N-vinylpyrrolidone ("NVP"), or a terpolymer of acrylamide and up to about 40 mole % of a combination of AMPS and NVP.

The average molecular weight of the water soluble acrylamide polymer used in the methods described herein is generally in a range from about 0.5 to about 25 megadaltons ("MDa"), preferably from about 1 to about 20 MDa, and most preferably from about 3 to about 15 MDa.

The acrylamide polymers are commercially available from various sources.

The organic crosslinking agent can be a non-metallic crosslinking agent or a crosslinkable acrylamide polymer as described herein. The organic crosslinking agent effectuates chemical crosslinking between appropriate sites of the acrylamide polymer and the crosslinking agent, thereby creating the three dimensional network structure of the crosslinked acrylamide polymer. The crosslinkable acrylamide polymer can be introduced into the injection fluid in the methods described herein, or the water soluble acrylamide polymer and the non-metallic organic crosslinking agent can be introduced into the injection fluid. In either case, chemical crosslinking can occur between appropriate sites of the acrylamide polymer and the crosslinkable polymer as the polymer flows through the formation.

The crosslinking agents are generally polymeric polyamines.

The polymeric polyamines can have a molecular weight greater than 5,000 Daltons, but preferably below 2,000,000 Daltons, where at least 1 mole percent and up to 99 mole percent of the mer content of the polymer is a polymerizable primary and/or secondary amine-containing monomer. The polymeric polyamines can have molecular weights from 100,000 to 1,500,000 Daltons. Generally, at least 10 mole percent and up to 70 mole percent of the mer units are amine containing vinyl- or allyl-monomers. Preferably, the amine-containing monomer in the polymer is diallylamine.

The non-metallic organic crosslinking agent comprises a polymeric polyamine which is either (i) a reaction product of a polymerization mixture comprised of at least one monomer of Formulae I, II, or III, or a salt thereof; or (ii) comprised of at least one structural unit of Formulae IA, IIA, IIIA, IIIB or IVB, wherein Formulae I, II, III, IA, IIA, IIIA, IIIB and IVA have the following structures:

wherein $R_1$ is each independently hydrogen, a protecting group, or alkyl; and $R_2$, $R_3$, $R_4$, $R_5$, $R_6$ and $R_7$ are each independently hydrogen, alkyl, or alkoxylalkyl.

The polymeric polyamine can include a polymer with randomly distributed repeating monomer units of Formulae I, II, and/or III and/or a salt thereof.

The polymeric polyamine can include a polymer with alternating repeating monomer units of Formulae I, II, and/or III and/or a salt thereof.

The polymeric polyamine can include a polymer with blocks formed of repeating monomer units of Formulae I, II, and/or III and/or a salt thereof.

The polymeric polyamine can be a homopolymer or copolymer, such as a homopolymer or copolymer of a dialkylamine. Examples include, but are not limited to, a homopolymer of a diallylamine, a copolymer of diallylamine with an acrylamide or an acrylic acid, a terpolymer of diallylamine with an acrylamide and an acrylic acid, a copolymer of diallylamine with AMPS, a copolymer of diallylamine with NVP, a terpolymer of diallylamine with AMPS and an acrylamide, a terpolymer of diallylamine with AMPS and an acrylic acid, a terpolymer of diallylamine with AMPS and an acrylamide, and a terpolymer of diallylamine with AMPS and NVP.

Various additional co-monomer(s) can be included in the polymeric polyamine, including, but not limited to, one or more vinyl addition monomers including nonionic, cationic, anionic, and zwitterionic, with non-ionic and cationic being the preferred co-monomers. The co-monomer(s) is preferably water-soluble or at least result in a water-soluble copolymer.

Representative nonionic co-monomers which can be included in the polymeric polyamine include N-vinylformamide, N-vinylmethylacetamide, N-vinyl pyrrolidone, hydroxyethyl methacrylate, hydroxyethyl acrylate, hydroxypropyl acrylate, hydroxypropyl methacrylate, vinyl acetate, vinyl alcohol, or a combination thereof.

Representative anionic co-monomers which can be included in the polymeric polyamine include acrylic acid and its salts, including, but not limited to sodium acrylate and ammonium acrylate; methacrylic acid and its salts, including, but not limited to sodium methacrylate and ammonium methacrylate; 2-acrylamido-2-methylpropanesulfonic acid ("AMPS®"); the sodium salt of AMPS; sodium vinyl sulfonate; styrene sulfonate; maleic acid and its salts, including, but not limited to the sodium salt, the ammonium salt, sulfonate, itaconate, sulfopropyl acrylate or methacrylate or other water-soluble forms of these or other polymerizable carboxylic or sulfonic acids; sulfomethylated acrylamide; allyl sulfonate; sodium vinyl sulfonate; itaconic acid; acrylamidomethylbutanoic acid; fumaric acid; vinylphosphonic acid; vinylsulfonic acid; allylphosphonic acid; sulfomethylated acrylamide; phosphonomethylated acrylamide; itaconic anhydride; or a combination thereof.

Representative cationic co-monomers which can be included in the polymeric polyamine include dialkylaminoalkyl acrylates and methacrylates and their quaternary or acid salts, including, but not limited to, dimethylaminoethyl acrylate methyl chloride quaternary salt, dimethylaminoethyl acrylate methyl sulfate quaternary salt, dimethyaminoethyl acrylate benzyl chloride quaternary salt, dimethylaminoethyl acrylate sulfuric acid salt, dimethylaminoethyl acrylate hydrochloric acid salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate, diallyldiethylammonium chloride and diallyldimethyl ammonium chloride, or a combination thereof. When present, alkyl groups are generally $C_1$ to $C_4$ alkyl.

Representative zwitterionic co-monomers which can be included in the polymeric polyamine include N,N-dimethyl-N-acryloyloxyethyl-N-(3-sulfopropyl)-ammonium betaine; N,N-dimethyl-N-acrylamidopropyl-N-(2-carboxymethyl)-ammonium betaine; N,N-dimethyl-N-acrylamidopropyl-N-(3-sulfopropyl)-ammonium betaine; N,N-dimethyl-N-acrylamidopropyl-N-(2-carboxymethyl)-ammonium betaine; 2-(methylthio)ethyl methacryloyl-S-(sulfopropyl)-sulfonium betaine; 2-[(2-acryloylethyl)dimethylammonio]ethyl 2-methyl phosphate; 2-(acryloyloxyethyl)-2'-(trimethylammonium)ethyl phosphate; [(2-acryloylethyl)dimethylammonio]methyl phosphonic acid; 2-methacryloyloxyethyl phosphorylcholine; 2-[(3-acrylamidopropyl)dimethylammonio]ethyl 2'-isopropyl phosphate; 1-vinyl-3-(3-sulfopropyl)imidazolium hydroxide; (2-acryloxyethyl) carboxymethyl methylsulfonium chloride; 1-(3-sulfopropyl)-2- vinylpyridinium betaine; N-(4-sulfobutyl)-N-methyl-N,N-diallylamine ammonium betaine; N,N-diallyl-N-methyl-N-(2-sulfoethyl) ammonium betaine; or a combination thereof.

The polymeric polyamine can take the form of a water-in-oil emulsion, dry powder, dispersion, or aqueous solution.

The polymeric polyamine can be prepared via known free radical polymerization techniques in water using free radical initiation. The monomers used in preparing the polymeric polyamine are commercially available. A non-limiting example of a representative polymerization process is as follows. An aqueous solution of non-metallic organic crosslinking agent can be charged to a polymerization reactor, followed by a portion of an acrylamide (e.g., an amount which is approximately 10% of the total monomer solution). An acid such as sulfuric acid or a base such as sodium hydroxide can be used to maintain pH between 4-5. The mixture is then purged with nitrogen for about 30-60 minutes, and the temperature is adjusted to 74-76° C. When the correct temperature is achieved, an aqueous solution of a polymerization initiator such as ammonium persulfate and the remaining acrylamide monomer solution are slowly added over several hours. During this addition, agitation is continued and the temperature is maintained at 74-76° C. Once the addition is completed, the reactor is held at temperature with agitation for about an additional 30 minutes. The desired product viscosity and molecular weight can be achieved through addition of aqueous solutions of ammonium persulfate and/or sodium bisulfite.

Preferably, the polymeric polyamine is a homopolymer of diallylamine, a copolymer of diallylamine, or a mixture thereof. Particularly preferred copolymers are diallylamine-acrylamide ("DAA/AcAm") and DAA/AA. The diallylamine-containing polymer can also comprise other monomers.

In methods where a DAA/AcAm copolymer is employed, the mole percentage of diallylamine in the DAA/AcAm copolymer can be within a range of 1 to 99 percent. The DAA/AcAm copolymer can be primarily made up of diallylamine (i.e., comprise more DAA monomer units than AcAm monomer units). When cost is a deciding factor, the mole percentage of DAA in the polymeric polyamine can be 10 to 60, or 10 to 40.

As shown in the examples below, the amine content and molecular weight of the crosslinking agent have a significant impact on gelation rate and final gel strength.

The acrylamide polymer and non-metallic organic crosslinking agent form a flowable crosslinked polymer in situ within the subterranean formation. Crosslinking of the polymer component to give a three dimensional flowable polymer results from thermal activation, typically a temperature of at least 40° C. Thus, the flowable crosslinked polymer is not formed when the polymer and crosslinker are mixed before introduction into the wellbore or formation.

The flowable crosslinked polymers used in the methods described herein can be formed by introducing from about 200 to about 2,000 ppm or more (preferably from about 400 to about 1,500 ppm) of a water soluble acrylamide polymer and from about 5 to about 500 ppm (preferably from about 10 to about 200 ppm) of a non-metallic organic crosslinking agent into the injection fluid entering a subterranean formation. The acrylamide polymer and crosslinking agent can be mixed before introducing them into the injection fluid, or they can be introduced separately. Surface admixing to produce a composition broadly encompasses batch mixing the components in bulk prior to injection into the wellbore or mixing the components in-line during injection into the wellbore.

During the enhanced hydrocarbon recovery operation, the water soluble acrylamide polymer and the crosslinking agent can be continuously added into the injection fluid entering the wellbore or the formation.

During the enhanced hydrocarbon recovery operation, the water soluble acrylamide polymer and the crosslinking agent can be intermittently added into the injection fluid entering the wellbore or the formation.

During the enhanced hydrocarbon recovery operation, the water soluble acrylamide polymer can be intermittently added into the injection fluid entering the wellbore or the formation, and the crosslinking agent can be continuously added into the injection fluid entering the wellbore or the formation.

During the enhanced hydrocarbon recovery operation, the crosslinking agent can be intermittently added into the injection fluid entering the wellbore or the formation, and the water soluble acrylamide polymer can be continuously added into the injection fluid entering the wellbore or the formation.

The crosslinking agent is present in amounts such that the weight ratio of the acrylamide polymer to the non-metallic organic crosslinking agent ranges from about 100:1 to about 1:100, preferably from about 2:1 to 60:1, and more preferably from about 5:1 to 30:1. Generally, the greater the polymer to crosslinking agent ratio, the lower the gel strength and gelation rate that is achieved. As known to those skilled in the art, the exact amounts of polymer and crosslinking agent can be selected to provide a desired gel strength, gel stability at reservoir conditions; and a suitable gelation time for formation of the flowable crosslinked polymer.

Additional components that can be added to the acrylamide and crosslinking agent include fluid loss control additives, corrosion inhibitors, scale inhibitors, catalysts, clay control agents, biocides, friction reducers, surfactants, pH adjusting agents, antioxidants, additional crosslinking agents such as metallic crosslinking agents or aldehyde crosslinking agents, and the like.

The rate of gelation and gel strength depends on several parameters, including polymer type, crosslinker type, polymer to crosslinker ratio, reservoir temperature, brine salinity, and brine pH. Thus, the acrylamide and crosslinker components can be varied by the skilled artisan to achieve the desired effect for a particular field application.

For applications wherein the flowable crosslinked polymer is to be used primarily as a mobility control agent, typically one of ordinary skill would choose polymer and crosslinker concentrations below which gel formation is observed under simulated reservoir conditions (e.g., temperature and brine composition) in a bottle test. While crosslinking reactions may occur, the concentrations are not sufficient to generate large crosslinked species capable of significantly blocking enough pore throats within the rock matrix to be considered a conformance treatment.

In order to delay the rate of gelation for applications wherein deep reservoir penetration is desired, typically one of ordinary skill would choose polymer and crosslinker concentrations whereby there is a delay in gel formation, indicated by a significant increase in fluid viscosity upon aging under simulated reservoir conditions (e.g., temperature and brine composition) in a bottle test, such that the gelation delay is correlated to the desired depth of fluid penetration into the reservoir prior to gelation.

The methods described herein can be used to form a flowable crosslinked polymer in a subterranean formation for use with a drive fluid. The drive fluid may be potable water, surface water, seawater, aquifer water, deionized production water, produced water, and filtered water derived from any of the aforementioned sources. Said water is preferably a brine, for example seawater or is derived from a brine such as seawater. The references to the amounts of water herein suitably refer to water inclusive of its components, e.g. naturally occurring components such as found in seawater. The drive fluid can also include one or more surfactants.

The viscosity of the flowable crosslinked polymer increases at increased temperature and over time, and the flowable crosslinked polymer becomes non-flowable such that it remains fixed within a high permeability zone of the formation to divert fluid flow into unswept zones of the formation.

The method preferably involves introducing the acrylamide polymer and crosslinking agent into the subterranean formation via an injection well. The components may be introduced into a plurality of injection wells, either sequentially or substantially concurrently. The injection well can be a vertical well, a deviated well, a horizontal well, a multi-lateral well, or a branched well. Any means known to one skilled in the art can be used for injecting the components such as, for example, pumps.

The nature of the subterranean formation is not critical to the practice of the present invention. The components of the gelant can be injected into a subterranean formation having a temperature range of greater than or equal to about 40° C., such as from about 40 to about 110° C.

Preferably, formation of the flowable crosslinked polymer within the reservoir is the result of cross linking between the acrylamide polymer and the crosslinking agent at a minimum reservoir temperature of 50° C.

The flowable crosslinked polymer can also be applied in a number of other forms, including sweep improvement treatments, water shutoff treatments, gas shutoff treatments, zone abandonment treatments, squeeze and recompletion treatments, and water and gas coning treatments involving fractures and other linear-flow high permeability reservoir anomalies. Preferably, the method is used to treat fractures, microfractures, and fracture-like features that can cause channeling of injected fluids.

Having described the invention in detail, it will be apparent that modifications and variations are possible without departing from the scope of the invention defined in the appended claims.

The following non-limiting examples are provided to further illustrate the present invention.

Example 1: Preparation of Organic Crosslinking Agents

Crosslinkable diallylamine (DAA)-acrylamide polymers were prepared by polymerization of DAA and acrylamide. A diallylamine and water mixture with pH adjusted to 4-5 was charged to the reactor, followed by a portion of acrylamide (approximately 10% of the total monomer solution). Small amount of sulfuric acid or sodium hydroxide were used to maintain pH between 4-5. The mixture was then purged with nitrogen for 30-60 minutes, and temperature was adjusted to 74-76° C. When the correct temperature was achieved, a solution of ammonium persulfate (polymerization initiator) in water and the remaining acrylamide monomer solution were slowly added over several hours. During this addition, agitation was continued and the temperature was maintained at 74-76° C. Once addition was complete, the reactor was held at temperature with agitation for an additional 30 minutes. Aqueous solutions of ammonium persulfate and/or sodium bisulfate were added as necessary to achieve the desired product viscosity and molecular weight. A crosslinking agent was also formed from polymerization of DAA and acrylic acid. The following DAA-acrylamide polymers and acrylic-acid-DAA crosslinking agent are used in the examples, and were prepared from the amounts of monomers shown below in Table 1:

TABLE 1

| Identification # | Monomer Mol % | | | MW (kD) |
| --- | --- | --- | --- | --- |
| | Acrylamide | Acrylic Acid | DAA* | |
| #1 | 0 | 35 | 65 | 30 |
| #2 | 85 | 0 | 15 | ~1000 |
| #3 | 75 | 0 | 25 | 780 |
| #4 | 65 | 0 | 35 | 39 |
| #5 | 65 | 0 | 35 | ~500 |
| #6 | 35 | 0 | 65 | 200 |

Example 2: Preparation of Flowable Crosslinked Polymer

Crosslinker and potassium thiocyanate (KSCN; oxygen scavenger) stock solutions were prepared in brine immediately prior to gelant sample preparation. The appropriate amounts of polymer stock, brine, KSCN stock solution, and crosslinker stock solution were mixed together, in that order, to achieve the desired final flowable crosslinked polymer solution concentration. The flowable crosslinked polymer reactant samples were generally mixed by hand to achieve uniformity. After transferring to 20 mL headspace vials, the flowable crosslinked polymer reactant samples were sealed in a glove box under anaerobic conditions and then placed in ovens at the appropriate temperature for aging. After various aging times, new vials were removed from the oven each time and allowed to cool to ambient temperature before rheological testing.

Rheological testing was carried out using an Anton Paar MCR102 rheometer with a 25 mm plate-plate configuration. About 2 g of sample material was loaded onto the bottom plate via transfer pipette and the top plate was lowered slowly until a 1 mm gap was achieved. Experiments were run at 25° C. and consisted of a shear sweep from $1\ s^{-1}$ to $100\ s^{-1}$ unless otherwise noted.

Example 3: Effect of Crosslinker Concentration on Gelation Time and Gel Viscosity at 85° C.

Figure 1:
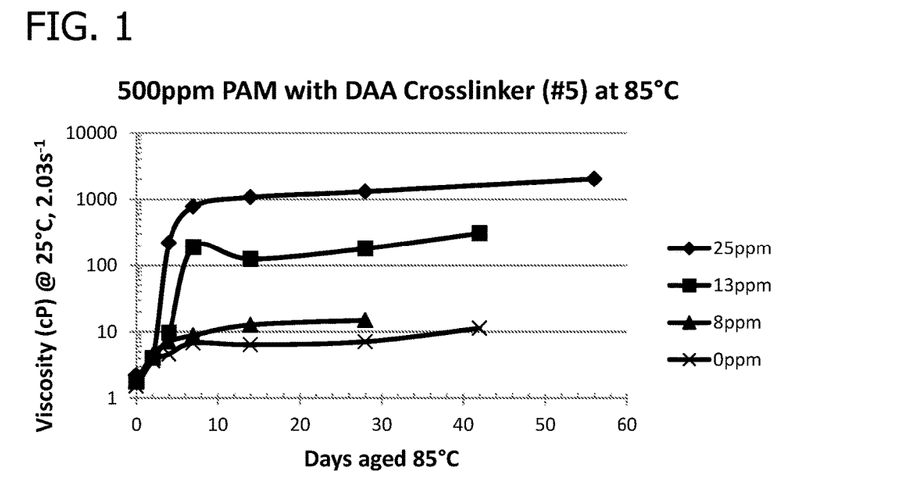
FIG. 1: Effect of crosslinker concentration on gelation time and gel viscosity at 85° C. Nonionic polyacrylamide (500 ppm) in 0.5% KCl with no crosslinking agent (—X—), with 8 ppm diallylamine ("DAA") crosslinking agent (-▲-), with 13 ppm crosslinking agent (-■-), and with 25 ppm crosslinking agent (-♦-).

Table 2 presents data on the effect of the crosslinker/acrylamide polymer ratio on gelation rate and gel viscosity (the polymer being formed from the monomer ratios shown as #5 in Table 1). These samples were kept at 85° C. with a fixed polymer concentration of 500 ppm. As shown in Table 2 and FIG. 1, gel viscosity increases as crosslinker/polymer ratio increases. Therefore, by increasing the crosslinker/polymer ratio, a stronger gel was formed.

TABLE 2

500 ppm PAM, DAA crosslinker (#5), 0.5% KCl, aged at 85° C.

| Days @ 85° C. | Viscosity @ 2.03 1/s Crosslinker ppm | | | |
|---|---|---|---|---|
| | 25 ppm | 13 ppm | 8 ppm | 0 ppm |
| 0 | 2.22 | 1.78 | 1.84 | 1.52 |
| 2 | 4.09 | 4.03 | 4.42 | 3.67 |
| 4 | 219 | 9.62 | 7.07 | 4.60 |
| 7 | 778 | 188 | 8.83 | 6.76 |
| 14 | 1075 | 125 | 12.7 | 6.38 |
| 28 | 1311 | 180 | 14.9 | 7.08 |
| 42 | | 308 | | 11.33 |
| 56 | 2030 | | | |

Example 4: Effect of Crosslinker Concentration on Gelation Time and Gel Viscosity at 65° C.

Figure 2:
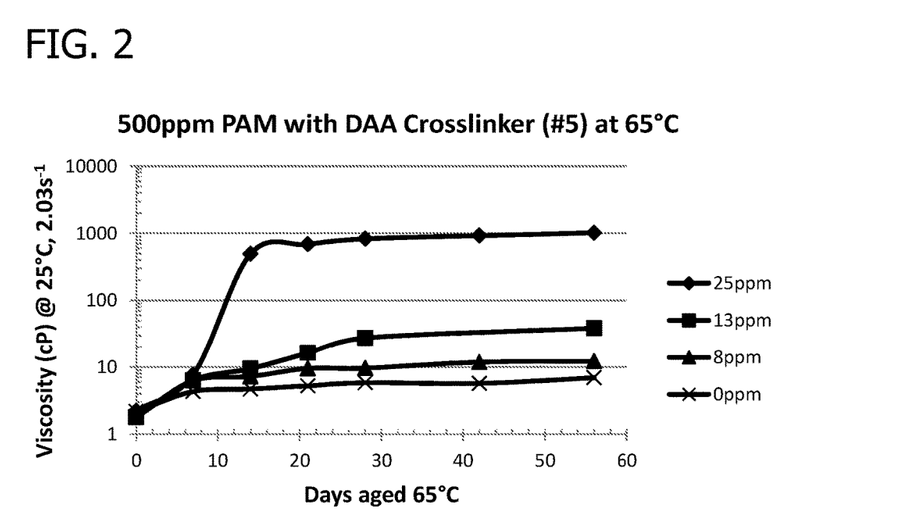
FIG. 2: Effect of crosslinker concentration on gelation time and gel viscosity at 65° C. Nonionic polyacrylamide (500 ppm) in 0.5% KCl with no crosslinking agent (—X—), with 8 ppm DAA crosslinking agent (-▲-), with 13 ppm crosslinking agent (-■-), and with 25 ppm crosslinking agent (-♦-).

Table 3 presents data on the effect of the crosslinker/acrylamide polymer ratio on gelation rate and gel viscosity for samples kept at 65° C. with a fixed polymer concentration of 500 ppm (the polymer being formed from the monomer ratios shown as #5 in Table 1). As compared to Table 2, the only variable changed was temperature. The same polymer, crosslinker, polymer concentration, and crosslinker/polymer ratios were tested. It can be seen from Table 3 and FIG. 2 that gelation time increases and gel strength decreases when the temperature at which the samples are aged is decreased from 85° C. to 65° C. Thus, the appropriate concentrations of acrylamide polymer and crosslinker can be chosen for a particular reservoir temperature.

TABLE 3

500 ppm PAM, DAA crosslinker (#5), 0.5% KCl, aged at 65° C.

| Days @ 65° C. | Viscosity @ 2.03 1/s Crosslinker ppm | | | |
|---|---|---|---|---|
| | 25 ppm | 13 ppm | 8 ppm | 0 ppm |
| 0 | 2.217 | 1.782 | 1.836 | 2.176 |
| 7 | 7.693 | 6.37 | 6.244 | 4.305 |
| 14 | 492.3 | 9.461 | 7.245 | 4.71 |
| 21 | 685 | 16.27 | 9.551 | 5.238 |
| 28 | 827.9 | 27.35 | 9.643 | 5.834 |
| 42 | 923.1 | | 11.87 | 5.712 |
| 56 | 1017 | 38.43 | 12.23 | 6.915 |

Example 5: Effect of Crosslinker Structure on Gelation Time and Gel Viscosity at 85° C.

Figure 3:
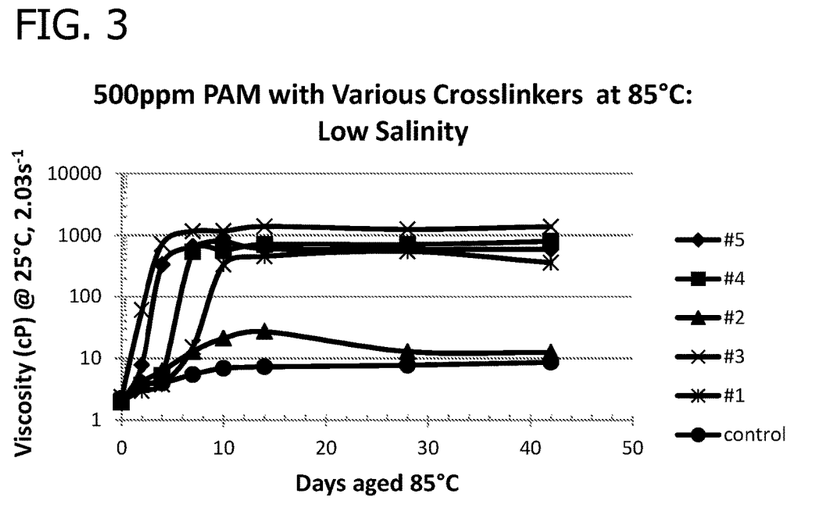
FIG. 3: Effect of crosslinker structure on gelation time and gel viscosity at 85° C. Nonionic polyacrylamide (500 ppm) and 50 ppm crosslinking agent in 0.5% KCl. With no crosslinking agent (-●-), with DAA/acrylic acid ("DAA/AA") crosslinking agent #1 (-*-), with crosslinkable acrylamide polymer #2 (-▲-), with crosslinkable acrylamide polymer #3 (—X—), with crosslinkable acrylamide polymer #4 (-■-), and with crosslinkable acrylamide polymer #5 (-♦-).

Table 4 and FIG. 3 show that the structure of the crosslinker has a large impact on both the gelation rate and final gel strength. Samples #2-5 are the crosslinkable acrylamide polymers of Table 1 while sample #1 is the diallylamine/acrylic acid crosslinking agent of Table 1. The control sample is polymer with no crosslinker. At a temperature of 85° C., this selection of crosslinkers is able to cover a gelation time from 2 days to 7 days with maximum gel strengths ranging from 27 cP up to nearly 1400 cP. By varying both the polymer concentration and the crosslinker concentration, an even wider range of target gelation rates and strengths should be achievable with selection of a proper crosslinker.

TABLE 4

500 ppm PAM, 50 ppm Crosslinker, 0.5% KCl, aged at 85° C.

| Days @ 85° C. | Viscosity @ 2.03 1/s Crosslinker (#1) or Crosslinkable Acrylamide Polymer (#2-5) | | | | | |
|---|---|---|---|---|---|---|
| | #1 | #2 | #3 | #4 | #5 | Control |
| 0 | 2.057 | 2.042 | 2.367 | 1.93 | 1.91 | 2.245 |
| 2 | 2.969 | 4.061 | 60.24 | 3.715 | 7.78 | 3.835 |
| 4 | 3.73 | 6.234 | 716.00 | 5.247 | 334 | 3.97 |
| 7 | 15.04 | 12.78 | 1164 | 537.5 | 659 | 5.465 |
| 10 | 333.6 | 21.02 | 1174 | 565.3 | 810 | 6.888 |
| 14 | 457.5 | 27.11 | 1393 | 715.8 | 604 | 7.29 |
| 28 | 549 | 12.81 | 1252 | 707.9 | | 7.703 |
| 42 | 359.2 | 12.47 | 1379 | 801.1 | 595 | 8.662 |

Example 6: Effect of Brine Salinity and Hardness on Gelation Time and Gel Viscosity at 85° C.

Figure 4:
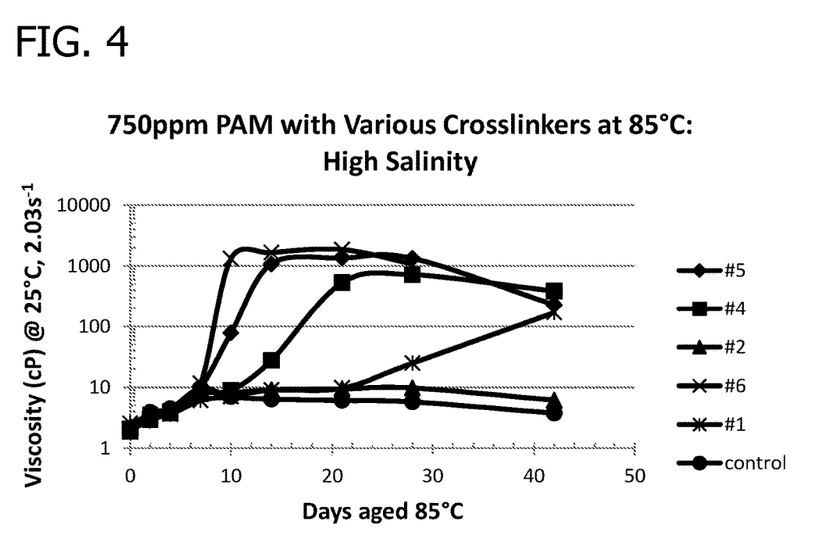
FIG. 4: Effect of brine salinity and hardness on gelation time and gel viscosity at 85° C. Nonionic polyacrylamide (750 ppm) and crosslinking agent (75 ppm) in brine (36,000 TDS, 3500 ppm hardness). With no crosslinking agent (-●-), with DAA/AA crosslinking agent #1 (-*-), with crosslinkable acrylamide polymer #2 (-▲-) with crosslinkable acrylamide polymer #4 (-■-), with crosslinkable acrylamide polymer #5 (-♦-), and with crosslinkable acrylamide polymer #6 (—X—).

Table 5 and FIG. 4 shows data from a study performed in 36,000 TDS brine (3500 ppm hardness). In order to achieve gelation in this brine, it was necessary to increase the polymer concentration up to 750 ppm and the crosslinker concentration up to 75 ppm to give a 10:1 polymer to crosslinker ratio. Comparing the high salinity results to those in Table 4, it can be seen that the increased salinity/hardness of the brine had a significant retarding effect on the gelation rate, even with higher polymer and crosslinker concentrations. For example, crosslinker #5 (of Table 1) took only 3-4 days to gel in 0.5% KCl (Table 4) but took 7-10 days to begin gelation at high salinity (Table 5). Interestingly, crosslinkable acrylamide polymer #2 never formed a gel while crosslinker #1 took up to 28 days before weak gelation began to occur. Again, a wide range of gel times and gel strengths are achievable in high salinity brine with the appropriate selection of polymer and crosslinker concentrations and crosslinker reactivity.

TABLE 5

750 ppm PAM, 75 ppm Crosslinker, 36,000 TDS/3500 hardness brine, 85° C.

| Days @ 85° C. | Viscosity @ 2.03 1/s Crosslinker (#1) or Crosslinkable Acrylamide Polymer (#2, 4-6) | | | | | |
|---|---|---|---|---|---|---|
| | #1 | #2 | #4 | #5 | #6 | Control |
| 0 | 2.547 | 1.89 | 2.092 | 2.004 | 1.853 | 2.112 |
| 2 | 3.381 | 3.302 | 2.95 | 2.872 | 3.553 | 3.876 |
| 4 | 3.63 | 3.812 | 3.819 | 3.977 | 4.06 | 4.42 |
| 7 | 6.082 | 7.861 | 7.832 | 9.985 | 11.58 | 9.652 |
| 10 | 7.061 | 8.12 | 8.926 | 77.63 | 1313 | 7.05 |
| 14 | 8.968 | 9.093 | 27.7 | 1079 | 1659 | 6.378 |
| 21 | 9.676 | 9.453 | 529.8 | 1339 | 1855 | 6.078 |
| 28 | 24.89 | 9.75 | 717.6 | 1333 | 1069 | 5.753 |
| 42 | 168.6 | 6.131 | 385.3 | 229.1 | | 3.75 |

Example 7: Effect of Polymer Structure on Gelation Time and Gel Viscosity at 100° C.

Table 6 shows data from a gelation study performed in synthetic brine (37,000 TDS, 2000 ppm hardness). A number of acrylamide containing polymers having different anionic content were mixed with a crosslinkable acrylamide polymer of various molecular weight or a polymeric crosslinking agent, and were screened for their effectiveness. The acrylamide polymer concentration was 900 ppm, the crosslinkable acrylamide polymer or crosslinking agent concentration was 90 ppm, and the samples were aged for one week at 100° C. All of the polymers were able to form gels with the crosslinkable acrylamide polymer or crosslinking agent as shown in Table 6. Gel viscosities ranged from 6 cP up to more than 300 cP, indicating that some of the samples could have gelled at a polymer concentration much lower than 900 ppm. It is also apparent from the previously described experiments that the polymer and crosslinker concentrations can be adjusted to achieve a desired gelation rate. Without taking polymer molecular weight into consideration, it is difficult to discern a trend that is dependent on polymer charge content. Without being bound by any particular theory, it is believed, based on chemical considerations, that both polymer molecular weight and charge play a role in both gelation rate and final gel strength. The data presented here provide evidence that a wide range of gel viscosities is possible by varying the polymers and crosslinker used. Since this study was performed in a rather high salinity and hard brine at 100° C. with a high success rate, it supports the use of the inventive weak gels for high salinity/hardness/temperature applications. AMPS® means 2-acrylamido-2-methylpropanesulfonic acid monomer, AcAm means acrylamide monomer, and AA means acrylic acid monomer.

As used herein, a gel formed "in situ" is defined as a gel produced within the wellbore, the surrounding strata or a subterranean formation.

The term "partially hydrolyzed polyacrylamide" or "PHPA" is an anionic form of polyacrylamide wherein a percentage of the amido groups have been hydrolyzed to carboxylate groups.

The term "polymer" refers to a molecule built up by repetitive bonding together of smaller units called monomers. The polymer can be linear, branched, network, star, comb or ladder type of polymer. The polymer can be a reversibly crosslinked particle prior to injection. The polymer can be a homopolymer in which a single monomer is used or can be a copolymer in which two or more monomers are used. Types of copolymers include alternating, random, block, and graft.

As used herein, "ppm" refers to weight ratio in parts per million, based on total weight.

"Profile control" refers to technologies that improve the injection profile of an injection well and thus improves sweep efficiency.

The term "protecting group" denotes a group that blocks reaction at the protected portion of a compound, such as a

TABLE 6

900 ppm AcAm, 90 ppm Crosslinkable Acrylamide Polymer or Crosslinker, 36,000 TDS/2100 hardness Brine

| Gelling Polymer mol % AcAm (monomer) | Gelling Polymer mol % anionic | Viscosity @ 2.03 1/s after 7 days aging at 100° C. Crosslinker (#1) or Crosslinkable Acrylamide Polymer (#2-5) | | | | | |
|---|---|---|---|---|---|---|---|
| | | #1 | #2 | #3 | #4 | #5 | control |
| 75 | 25 (AMPS) | 898 | 766 | 987 | 978 | 620 | 5.30 |
| 87.5 | 12.5 (AMPS) | 5.42 | 5.87 | 806 | 128 | 667 | 3.24 |
| 90 | 10 (AA) | 288 | 176 | 1046 | 283 | 475 | 4.32 |
| 90 | 10 (AA) | 1924 | 1705 | 3075 | 1562 | 1699 | 7.38 |
| 93 | 7 (AA) | 8.95 | 9.12 | 1077 | 629 | 855 | 5.01 |
| 94 | 6 (AA) | 3.49 | 22.4 | 798 | 237 | 1678 | 3.75 |
| 95 | 5 (AA) | 1317 | 1576 | 1643 | 1614 | 1555 | 7.33 |
| 97 | 3 (AA) | 7.00 | 5.92 | 813 | 123 | 1339 | 3.76 |
| | Crosslinker or Crosslinkable Acrylamide Polymer MW | 500 kD | 39 kD | 1000 kD | 780 kD | 30 kD | |

A number of specific terms are used to describe the method of the present invention and are defined as follows:

As used herein, "conformance control" refers to technologies in which chemical or mechanical methods are used to reduce or block water/gas production resulting from wellbores or high permeability zones/channels/fractures of reservoirs. The main purposes of conformance control treatment are to reduce water production and increase oil production.

A "crosslinkable acrylamide polymer" comprises a reaction product of a polymerization mixture comprised of at least one acrylamide monomer and at least one monomer of the Formula I, II, or III or a salt thereof.

A "gel" as referred to herein is a gel fluid that has attained either partial or full chemical-crosslinking maturation.

As used herein, "gelation time" is the time from mixing of the polymer and crosslinker to the formation of a gel. The gel point is marked by a sudden increase in viscosity.

The term 'high permeability zone' is defined as a region of a subterranean formation (such as fractures or pores) where permeability is greater than the permeability of the surrounding strata. A high permeability zone is in communication with the wellbore.

nitrogen, while being easily removed under conditions that are sufficiently mild so as not to disturb other substituents of the compound. For example, a variety of nitrogen protecting groups and the synthesis thereof may be found in "Protective Groups in Organic Synthesis" by T. W. Greene and P. G. M. Wuts, Eds., John Wiley & Sons, New York, 1999.

"Viscosity" is a property of fluids that indicates their resistance to flow, defined as the ratio of shear stress to shear rate.

The term "wellbore" is a bore hole extending from the earth surface to a reservoir. Thus, a wellbore is a conduit providing fluid communication between the surface and the formation penetrated below. The term "well" is synonomous with the term "wellbore."

Other terms used herein have definitions within accordance with the conventional usage of a skilled artisan, unless otherwise defined.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and processes without departing from the scope of the invention, it is intended that all matter contained in the above description and shown in the accompanying drawings shall be interpreted as illustrative and not in a limiting sense.

What is claimed is:

1. A method of treating a wellbore or subterranean hydrocarbon-bearing formation to increase hydrocarbon recovery from the formation, the method comprising:
   introducing either a water soluble acrylamide polymer and a non-metallic organic crosslinking agent, or a crosslinkable acrylamide polymer, into an injection fluid entering the wellbore or the formation;
   wherein the water soluble acrylamide polymer and the non-metallic organic crosslinking agent or the crosslinkable acrylamide polymer form a flowable crosslinked polymer in the presence of the injection fluid flowing within the formation and the flowable crosslinked polymer pushes the hydrocarbon out of the formation while the flowable crosslinked polymer continues to flow through the formation;
   the non-metallic organic crosslinking agent comprising a polymeric polyamine which is either (i) a reaction product of a polymerization mixture comprised of at least one monomer of Formulae II or a salt thereof; or (ii) comprised of at least one structural unit of Formulae IIA, wherein Formulae II, and IIA have the following structures:

wherein:
$R_1$ is each independently hydrogen, a protecting group, or alkyl; and
$R_2$, $R_3$, $R_4$, $R_5$, $R_6$ and $R_7$ are each independently hydrogen, alkyl, or alkoxylalkyl; and
the crosslinkable acrylamide polymer comprising a reaction product of a polymerization mixture comprised of at least one acrylamide monomer and at least one monomer of the Formula II or a salt thereof,
wherein if the non-metallic organic crosslinking agent comprises diallylamine as the structure of Formula II, then the non-metallic organic crosslinking agent comprises a copolymer of diallylamine with an acrylamide or an acrylic acid; or a terpolymer of diallylamine with an acrylamide and an acrylic acid; or a copolymer of diallylamine with 2-acrylamido-2-methylpropane sulfonic acid ("AMPS") or N-vinylpyrrolidone ("NVP"); or a terpolymer of diallylamine with AMPS and NVP.

2. The method of claim 1, wherein the water soluble acrylamide polymer concentration is from about 200 to about 2,000 ppm.

3. The method of claim 1, wherein the non-metallic organic crosslinking agent concentration is from about 5 to about 500 ppm.

4. The method of claim 1, wherein either: the subterranean formation is an oil-bearing sandstone or carbonate reservoir; the produced fluid is treated to recover the hydrocarbon; or the injection fluid comprises seawater, aquifer water, produced water, or a surfactant.

5. The method of claim 1, wherein viscosity of the flowable crosslinked polymer increases at increased temperature and the flowable crosslinked polymer becomes non-flowable such that it remains fixed within a high permeability zone of the formation to divert fluid flow into unswept zones of the formation.

6. The method of claim 1, wherein the non-metallic organic crosslinking agent is a polyamine comprising a homopolymer or copolymer of a dialkylamine.

7. The method of claim 6, wherein either: the non-metallic organic crosslinking agent comprises the copolymer of diallylamine with the acrylamide or the acrylic acid, or the terpolymer of diallylamine with the acrylamide and the acrylic acid; or the non-metallic organic crosslinking agent comprises the copolymer of diallylamine with AMPS or NVP, or the terpolymer of diallylamine with AMPS and NVP.

8. The method of claim 1, wherein the crosslinkable acrylamide polymer is introduced into the injection fluid.

9. The method of claim 8, wherein the crosslinkable acrylamide polymer is introduced into the injection fluid, and a water soluble acrylamide polymer is introduced into the injection fluid.

10. The method of claim 9, wherein the water soluble acrylamide polymer and the crosslinkable acrylamide polymer are continuously added into the injection fluid entering the wellbore or the formation; the water soluble acrylamide polymer and the crosslinkable acrylamide polymer are intermittently added into the injection fluid entering the wellbore or the formation; the water soluble acrylamide polymer is intermittently added into the injection fluid entering the wellbore or the formation, and the crosslinkable acrylamide polymer is continuously added into the injection fluid entering the wellbore or the formation; or the crosslinkable acrylamide polymer is intermittently added into the injection fluid entering the wellbore or the formation, and the water soluble acrylamide polymer is continuously added into the injection fluid entering the wellbore or the formation.

11. The method of claim 1, wherein the water soluble acrylamide polymer and the non-metallic organic crosslinking agent are introduced into the injection fluid.

12. The method of claim 11, wherein the water soluble acrylamide polymer and the non-metallic organic crosslinking agent are separately introduced into the injection fluid.

13. The method of claim 11, wherein the weight ratio of the water soluble acrylamide polymer to the non-metallic organic crosslinking agent ranges from about 100:1 to about 1:100 or from about 2:1 to about 60:1.

14. The method of claim 11, wherein the water soluble acrylamide polymer comprises polyacrylamide or partially hydrolyzed polyacrylamide containing up to about 40 mole percent degree of hydrolysis.

15. The method of claim 11, wherein the water soluble acrylamide polymer comprises either: an anionic co-polymer of acrylamide and up to about 40 mole % of an acrylic acid; an anionic co-polymer of acrylamide and up to about 40 mole % of AMPS; an anionic terpolymer of acrylamide and up to about 40 mole % of a combination of acrylic acid and AMPS; a terpolymer of acrylamide and up to about 40 mole % of a combination of AMPS and NVP; or a terpolymer of acrylamide and up to about 40 mole % of a combination of t-butyl-acrylate and NVP.

16. The method of claim 11, wherein during the enhanced hydrocarbon recovery operation, the water soluble acrylamide polymer and the non-metallic organic crosslinking agent are continuously added into the injection fluid entering the wellbore or the formation; the water soluble acrylamide polymer and the non-metallic organic crosslinking agent are intermittently added into the injection fluid entering the wellbore or the formation; the water soluble acrylamide polymer is intermittently added into the injection fluid entering the wellbore or the formation, and the non-metallic organic crosslinking agent is continuously added into the injection fluid entering the wellbore or the formation; or the non-metallic organic crosslinking agent is intermittently added into the injection fluid entering the wellbore or the formation, and the water soluble acrylamide polymer is continuously added into the injection fluid entering the wellbore or the formation.

17. The method of claim 11, wherein the water soluble acrylamide polymer has a molecular weight of from about 0.05 to about 25 megadaltons ("MDa") or from about 5,000 Daltons to about 25 MDa.

18. The method of claim 17, wherein the non-metallic organic crosslinking agent has a molecular weight of from about 0.1 to about 1.5 MDa.

* * * * *